United States Patent
Vailliencourt et al.

(10) Patent No.: US 11,560,047 B2
(45) Date of Patent: Jan. 24, 2023

(54) SUPPORT APPARATUS FOR AN OFF-AXLE LOAD

(71) Applicant: Dana Heavy Vehicle Systems Group, LLC, Maumee, OH (US)

(72) Inventors: Robert L. Vailliencourt, Wauseon, OH (US); William F. Waltz, Toledo, OH (US); Steven J. Wesolowski, Waterville, OH (US); George A. Willford, Waterville, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 176 days.

(21) Appl. No.: 17/046,725

(22) PCT Filed: Apr. 12, 2019

(86) PCT No.: PCT/US2019/027250
§ 371 (c)(1),
(2) Date: Oct. 9, 2020

(87) PCT Pub. No.: WO2019/200272
PCT Pub. Date: Oct. 17, 2019

(65) Prior Publication Data
US 2021/0162848 A1   Jun. 3, 2021

Related U.S. Application Data

(60) Provisional application No. 62/657,008, filed on Apr. 13, 2018.

(51) Int. Cl.
*B60K 1/00* (2006.01)
*B60G 9/00* (2006.01)
(Continued)

(52) U.S. Cl.
CPC ............... *B60K 1/00* (2013.01); *B60G 9/003* (2013.01); *B62D 21/11* (2013.01);
(Continued)

(58) Field of Classification Search
CPC .... B60K 1/00; B60K 2001/001; B60G 9/003; B60G 2204/143; B60G 2200/30;
(Continued)

(56) References Cited

U.S. PATENT DOCUMENTS

| | | | |
|---|---|---|---|
| 562,289 A * | 6/1896 | DeDion | B60G 9/00 475/222 |
| 2,102,923 A * | 12/1937 | Szekely | B60G 3/24 180/56 |

(Continued)

FOREIGN PATENT DOCUMENTS

| | | | | |
|---|---|---|---|---|
| DE | 102017002198 A1 * | 9/2018 | | B60K 1/04 |
| DE | 102019103185 A1 * | 8/2020 | | |

(Continued)

OTHER PUBLICATIONS

ISA European Patent Office, International Search Report and Written Opinion Issued in Application No. PCT/US2019/027250, dated Jul. 18, 2019, WIPO, 13 pages.

*Primary Examiner* — James A Shriver, II
*Assistant Examiner* — Michael T. Walsh
(74) *Attorney, Agent, or Firm* — McCoy Russell LLP

(57) ABSTRACT

A vehicle including a frame having an axle and a support apparatus coupled thereto. The support apparatus is configured to support a load coupled to the axle and permit the load to translate along an x-axis, a y-axis, and a z-axis.

15 Claims, 7 Drawing Sheets

(51) Int. Cl.
*B62D 21/11* (2006.01)
*F16H 57/025* (2012.01)
*F16H 57/02* (2012.01)

(52) U.S. Cl.
CPC .. *B60G 2204/143* (2013.01); *B60K 2001/001* (2013.01); *F16H 57/025* (2013.01); *F16H 2057/02034* (2013.01); *F16H 2057/02052* (2013.01)

(58) Field of Classification Search
CPC ............ B60G 2200/31; B60G 2300/02; B62D 21/11; F16H 57/025; F16H 2057/02034; F16H 2057/02052

See application file for complete search history.

(56) References Cited

U.S. PATENT DOCUMENTS

| | | | |
|---|---|---|---|
| 4,433,744 A * | 2/1984 | Muhlbacher | B60K 1/00 180/312 |
| 4,676,415 A | 6/1987 | Kennedy | |
| 7,992,662 B2 * | 8/2011 | King | B60L 50/16 180/65.22 |
| 2007/0023221 A1 * | 2/2007 | Okuyama | B60K 5/1216 180/240 |
| 2017/0156262 A1 * | 6/2017 | Reichard | A01D 34/64 |
| 2020/0359565 A1 * | 11/2020 | Yamada | A01D 69/02 |
| 2021/0078397 A1 * | 3/2021 | Ito | B60G 9/003 |

FOREIGN PATENT DOCUMENTS

| | | | | |
|---|---|---|---|---|
| EP | 3693195 | A1 * | 8/2020 | |
| FR | 2495089 | A1 | 6/1982 | |
| FR | 2747616 | A1 | 10/1997 | |
| WO | WO-2019003633 | A1 * | 1/2019 | ............ B60B 35/16 |

* cited by examiner

US 11,560,047 B2

SUPPORT APPARATUS FOR AN OFF-AXLE LOAD

RELATED APPLICATION

The present application is a U.S. national phase of International Application No. PCT/US2019/027250, entitled "SUPPORT APPARATUS FOR AN OFF-AXLE LOAD", and filed on Apr. 12, 2019. International Application No. PCT/US2019/027250 claims priority to U.S. Provisional Application No. 62/657,008, entitled "SUPPORT METHOD FOR A MOTOR AND ELECTRIC TAG AXLE GEARBOX", and filed on Apr. 13, 2018. The entire contents of the above-listed applications are hereby incorporated by reference for all purposes.

TECHNICAL FIELD

The presently disclosed subject matter relates to a vehicle, and more particularly to a support apparatus for a load offset from an axle of the vehicle.

BACKGROUND

The automotive industry is rapidly moving away from conventional internal combustion engine vehicles to more efficient emerging technologies of electrified personal transportation in the form of hybrids, plug-in hybrids, fuel-cell and electric vehicles. Many hybrid and electric vehicles rely on an electric axle as a source of rotational power for the wheels. The electric axle commonly includes a power source (e.g. an electric motor), which is fully integrated into either the front or the rear axle of the vehicle. Such power source, however, may have a significant center of mass offset from a rotational axis of the electric axle. Since the center of mass is offset from the rotational axis of the electric axle, the integration of the power source with the electric axle causes an undesired torque (twisting) thereof.

It would be desirable to produce a support apparatus for a load offset from an axle of a vehicle, which is simple in design and easy to manufacture, while a cost and weight thereof is minimized.

SUMMARY

In concordance and agreement with the present disclosure, a support apparatus for a load offset from an axle of a vehicle, which is simple in design and easy to manufacture, while a cost and weight thereof is minimized, has surprisingly been discovered.

In one embodiment, a vehicle, comprises: a frame; and a support apparatus coupled to the frame, wherein the support apparatus is configured to support a load and permit the load to translate along at least one axis.

In another embodiment, a vehicle, comprises: a frame; an axle coupled to the frame; and a support apparatus coupled to the frame, wherein the support apparatus is configured to support a load coupled to the axle.

In yet another embodiment, a method for a vehicle, comprises the steps of: providing a frame; providing an axle coupled to the frame; providing a support apparatus coupled to the frame; and supporting a load coupled to the axle utilizing the support apparatus, wherein the support apparatus permits the load to translate along at least one axis.

As aspects of certain embodiments, the support apparatus is configured to permit the load to translate along an x-axis, a y-axis, and a z-axis.

As aspects of certain embodiments, the support apparatus includes at least one pivot axis.

As aspects of certain embodiments, the support apparatus includes a positioning member coupled to the frame at a center pivot to permit the load to translate along at least one of the x-axis and the z-axis.

As aspects of certain embodiments, the support apparatus includes a positioning member coupled to at least one connecting member at an end pivot to permit the load to translate along at least one of the x-axis, y-axis and the z-axis.

As aspects of certain embodiments, the support apparatus includes at least one connecting member disposed between a positioning member and the load to permit the load to translate along at least one of the x-axis, the y-axis, and the z-axis.

As aspects of certain embodiments, the support apparatus includes at least one pivotally coupled joint to permit the load to translate along at least one of the x-axis, the y-axis, and the z-axis.

As aspects of certain embodiments, the axle has a pivot axis offset from a rotational axis thereof.

As aspects of certain embodiments, the load is offset from the rotational axis of the axle.

As aspects of certain embodiments, the support apparatus has at least one pivot axis in horizontal alignment with the pivot axis of the axle.

As aspects of certain embodiments, the support apparatus has at least one pivot axis in common with at least one of the pivot axis of the axle and a pivot axis of a suspension system of the vehicle.

As aspects of certain embodiments, the pivot axis of the axle is in common with a pivot axis of a suspension system of the vehicle.

As aspects of certain embodiments, the support apparatus is pivotable about at least one axis.

BRIEF DESCRIPTION OF THE FIGURES DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
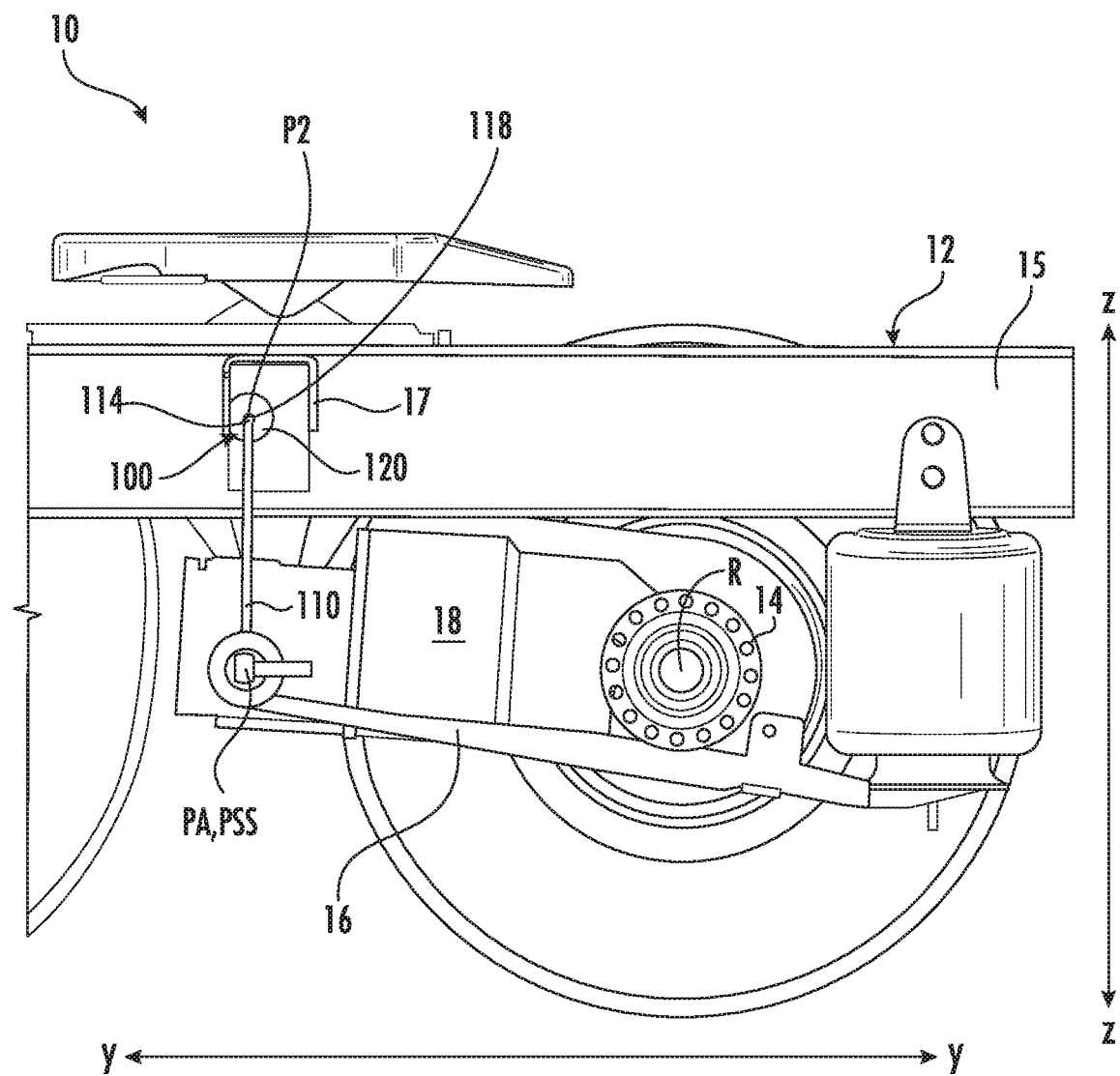
FIG. 1 is a side elevational view of a portion of a vehicle including a support apparatus for an off-axle load according to an embodiment of the presently disclosed subject matter.

It is to be understood that the presently disclosed subject matter may assume various alternative orientations and step sequences, except where expressly specified to the contrary. It is also to be understood that the specific apparatuses, systems, and methods illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIGS. 1-7 illustrate a portion of a vehicle 10 according to the presently disclosed subject matter. The vehicle 10 shown includes a frame 12 having at least one axle 14 and a suspension system 16 coupled thereto. The frame 12 may be formed by a pair of spaced apart elongate members 15 and at least one cross-member 17. It is understood that the frame 12 may be formed by any number, size, and configuration of members 15, 17 as desired. As illustrated, the axle 14 includes a load 18 coupled thereto. In certain embodiments, the axle 14 includes a rotational axis R and a pivot axis PA. A center of mass of the load 18 may be offset from the rotational axis R of the axle 14. In certain embodiments, the load 18 is a power source (e.g. an electric motor) coupled to the axle 14 for providing torque thereto. In certain embodiments, the pivot axis PA of the axle 14 is common with a pivot axis PSS of the suspension system 16.

Embodiments of support apparatuses 100, 200, 300 are described below. In certain embodiments, the support apparatuses 100, 200, 300 may be utilized with the vehicle 10 shown in FIGS. 1-7. The support apparatuses 100, 200, 300 and method of supporting the load 18 coupled to the axle 14 of the vehicle 10 may have applications in both light-duty and heavy-duty vehicles, and for passenger, commercial, and off-highway vehicles. Further, the support apparatuses 100, 200, 300 and the method of support of the load 18 coupled to the axle 14 may also have industrial, locomotive, military, agricultural, and aerospace applications, as well as applications in passenger, electric, and autonomous or semi-autonomous vehicles.

Figure 2:
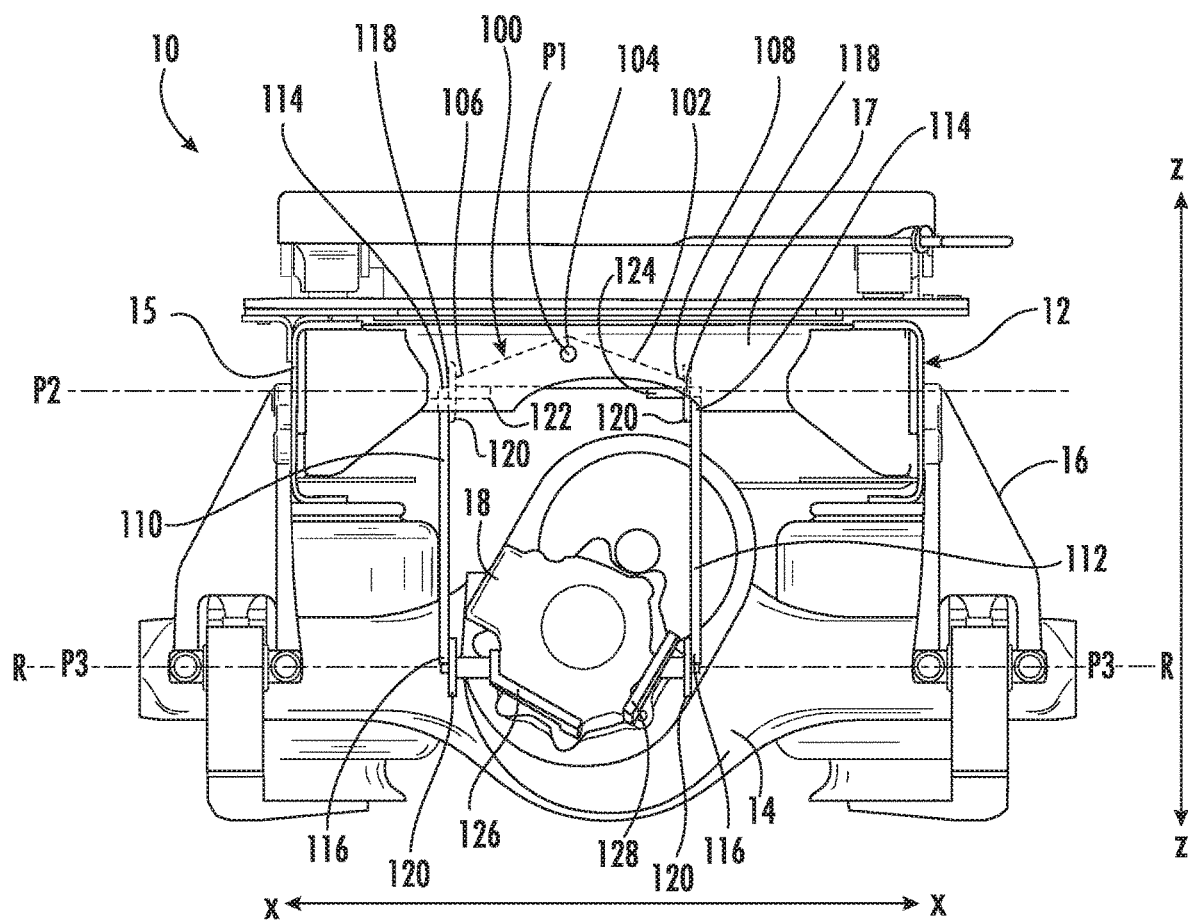
FIG. 2 is an elevational view, taken from a midsection of the vehicle directed rearward therefrom, of the portion of the vehicle including the support apparatus according to the embodiment shown in FIG. 1.
Figure 3:
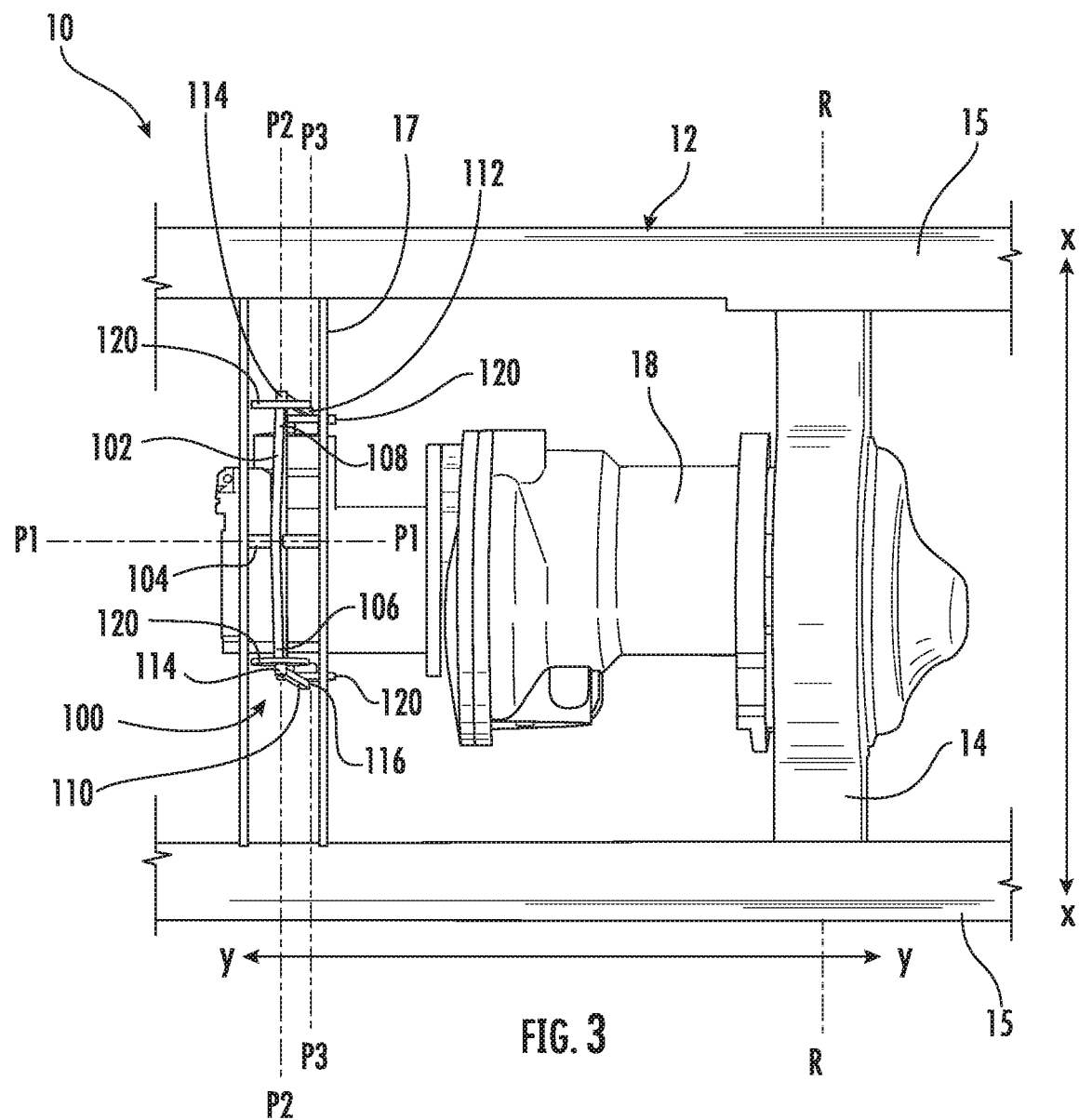
FIG. 3 is a top plan view of the portion of the vehicle including the support apparatus according to the embodiment shown in FIGS. 1-2.

Referring now to the support apparatus 100 shown in FIGS. 1-3, the support apparatus 100 includes a positioning member 102 coupled to the cross-member 17 of the frame 12. It is understood that the positioning member 102 may be any type of positioning device as desired. Various methods of coupling the positioning member 102 to the frame 12 may be employed as desired. In the embodiment shown, the positioning member 102 is coupled to the cross-member 17 by a fastener 104 (e.g. a pin) having opposing ends fixedly coupled to opposing sides of the cross-member 17. A center pivot at which the positioning member 102, is coupled to cross-member 17 defines a first pivot axis P1 of the support apparatus 100. An anti-friction element (not depicted) such as a bushing, for example, may be interposed between the fastener 104 and the positioning member 102 to minimize friction therebetween during a movement of the support apparatus 100 about the first pivot axis P1. In certain embodiments, the movement of the support apparatus 100 about the first pivot axis P1 permits the load 18 to translate along an x-axis and a z-axis.

Opposing ends 106, 108 of the positioning member 102 are each pivotally coupled to one of connecting members 110, 112, respectively. Various types of connecting members may be employed for the connecting members 110, 112 including, but not limited to, connecting rods, cables, biasing elements (e.g. springs), shock absorbers, struts, and the like. In certain embodiments, opposing ends 114, 116 of each of the connecting members 110, 112 may include an aperture 118 formed therein to facilitate a coupling of the connecting members 110, 112 to at least one of the positioning member 102 and the load 18. In one example, the aperture 118 formed in the ends 114, 116 of the connecting members 110, 112 is defined by a ring-shaped member 120, as shown in FIGS. 1-3. Each of the ring-shaped members 120 may be integrally formed with the ends 114, 116 of the connecting members 110, 112, or as a separate and distinct component (e.g. a washer) as desired. It should be appreciated that the apertures 118 may be defined by various other methods as desired.

In the embodiment shown, the ends 114 of the connecting members 110, 112 are each coupled to the respective ends 106, 108 of the positioning member 102 by fasteners 122, 124, respectively. A pair of end pivots at which the connecting members 110, 112 are coupled to the positioning member 102 defines a second pivot axis P2 of the support apparatus 100. In certain embodiments, the second pivot axis P2 of the support apparatus 100 is horizontally aligned along a y-axis with at least one of the pivot axis PA of the axle 14 and the pivot axis PSS of the suspension system 16. In certain embodiments, a movement of the support apparatus 100 about the second pivot axis P2 permits the load 18 to translate along the y-axis and the z-axis.

Similarly, the ends 116 of the connecting members 110, 112 are each coupled to the load 18. In certain embodiments, each of the ends 116 of the connecting members 110, 112 may be directly coupled to the load 18 by a fastener (not depicted) received in a boss (not depicted) integrally formed in the load 18. In other embodiments, each of the ends 116 of the connecting members 110, 112 may be coupled to the load 18 by support members 126, 128. Various shapes, sizes, and configurations may be employed for the support members 126, 128 depending on a corresponding shape, size, and configuration of the load 18. Another pair of end pivots at which the connecting members 110, 112 are coupled to the support members 126, 128, respectively, defines a third pivot axis P3 of the support apparatus 100. In certain embodiments, the third pivot axis P3 of the support apparatus 100 is horizontally aligned along the y-axis with at least one of the pivot axis PA of the axle 14, the pivot axis PSS of the suspension system 16, and the second pivot axis P2 of the support apparatus 100. In certain embodiments, a movement of the support apparatus 100 about the third pivot axis P3 permits the load 18 to further translate along the y-axis and the z-axis.

Figure 4:
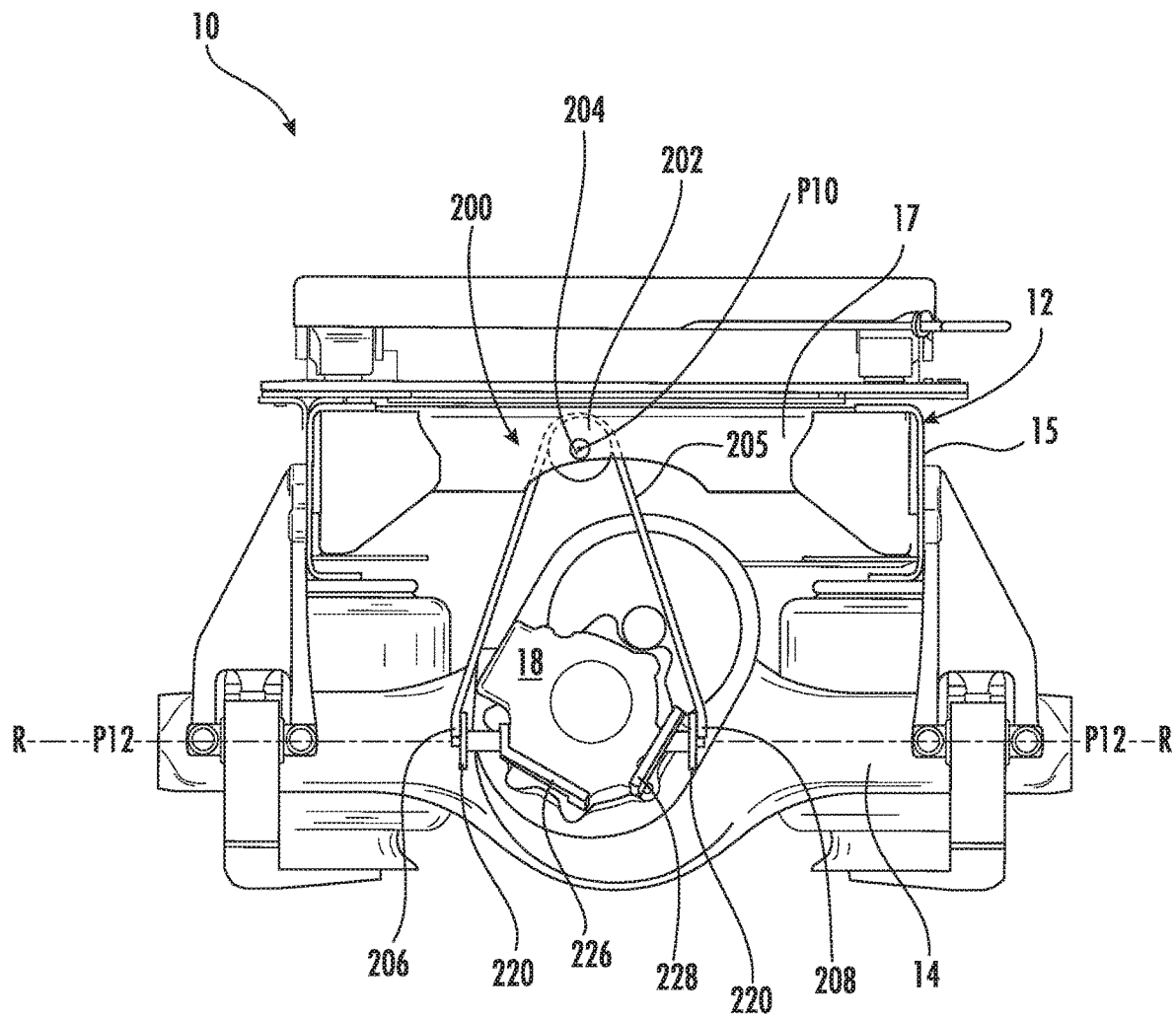
FIG. 4 is an elevational view, taken from a midsection of a vehicle directed rearward therefrom, of a portion of the vehicle including a support apparatus according to another embodiment of the presently disclosed subject matter.
Figure 5:
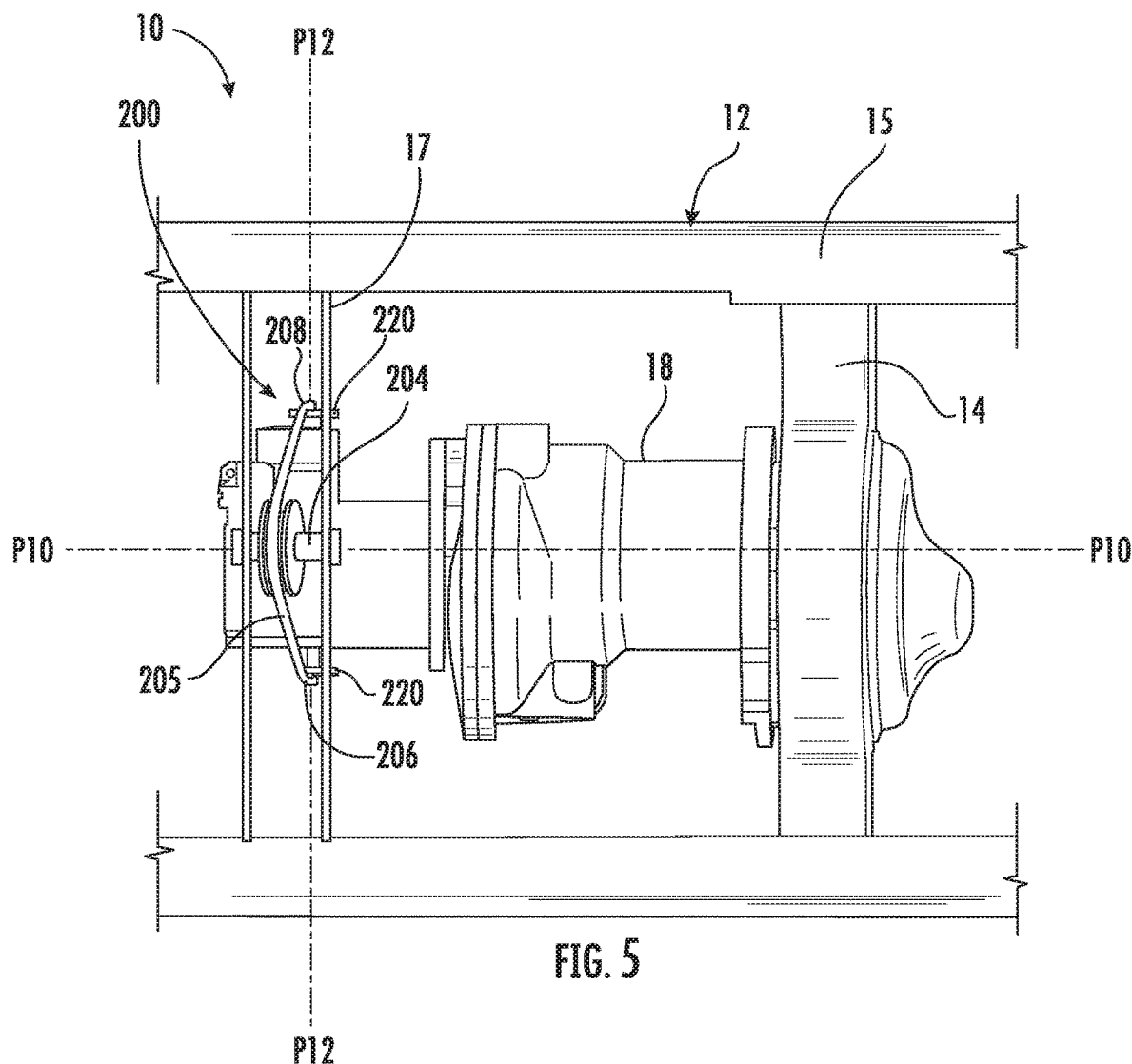
FIG. 5 is a top plan view of the portion of the vehicle including the support apparatus according to the embodiment shown in FIG. 4.

Referring now to FIGS. 4-5, another embodiment of the support apparatus 200 is illustrated. The support apparatus 200 includes a positioning member 202 coupled to the cross-member 17 of the frame 12. In certain embodiments, the positioning member 202 may be a pulley mechanism shown in FIGS. 4-5. However, it is understood that the positioning member 202 may be any type of positioning device as desired. Various methods of coupling the positioning member 202 to the frame 12 may be employed as desired. In the embodiment shown, the positioning member 202 is coupled to the cross-member 17 by a fastener 204 (e.g. a pin) having opposing ends fixedly coupled to opposing sides of the cross-member 17. A center pivot at which the positioning member 202 is coupled to cross-member 17 defines a first pivot axis P10 of the support apparatus 200. An anti-friction element (not depicted) such as a bushing, for example, may be interposed between the fastener 204 and the positioning member 202 to minimize friction therebetween during a movement of the positioning member 202 about the first pivot axis P10 of the support apparatus 200. In certain embodiments, the movement of the support apparatus 200 about the first pivot axis P10 permits the load 18 to translate along an x-axis and a z-axis.

A flexible connecting member 205 is at least partially disposed about the positioning member 202. Opposing ends 206, 208 of the connecting member 205 are each pivotally coupled to the load 18. In certain embodiments, the opposing ends 206, 208 of the connecting member 205 may include an aperture (not depicted) formed therein to facilitate a coupling of the connecting member 205 to the load 18. In one example, the aperture formed in the ends 206, 208 of the connecting member 205 is defined by a ring-shaped member 220, as shown in FIGS. 4-5. Each of the ring-shaped members 220 may be integrally formed with the ends 206, 208 of the connecting member 205, or as a separate and distinct component (e.g. a washer) as desired. It should be appreciated that the apertures may be defined by various other methods as desired. In the embodiment shown, the ends 206 of the connecting member 205 are each directly coupled to the load 18 by fasteners (not depicted) received in a boss (not depicted) integrally formed in the load 18. In other embodiments, each of the ends 206, 208 of the connecting member 205 may be coupled to the load 18 by support members 226, 228. Various shapes, sizes, and configurations may be employed for the support members 226, 228 depending on a corresponding shape, size, and configuration of the load 18. A pair of end pivots at which the connecting member 205 is coupled to the load 18 defines a second pivot axis P12. In certain embodiments, the second pivot axis P12 of the support apparatus 200 is horizontally aligned along the y-axis with at least one of the pivot axis PA of the axle 14 and the pivot axis PSS of the suspension system 16. In certain embodiments, a movement of the support apparatus 200 about the second pivot axis P12 permits the load 18 to translate along the y-axis and the z-axis.

Figure 6:
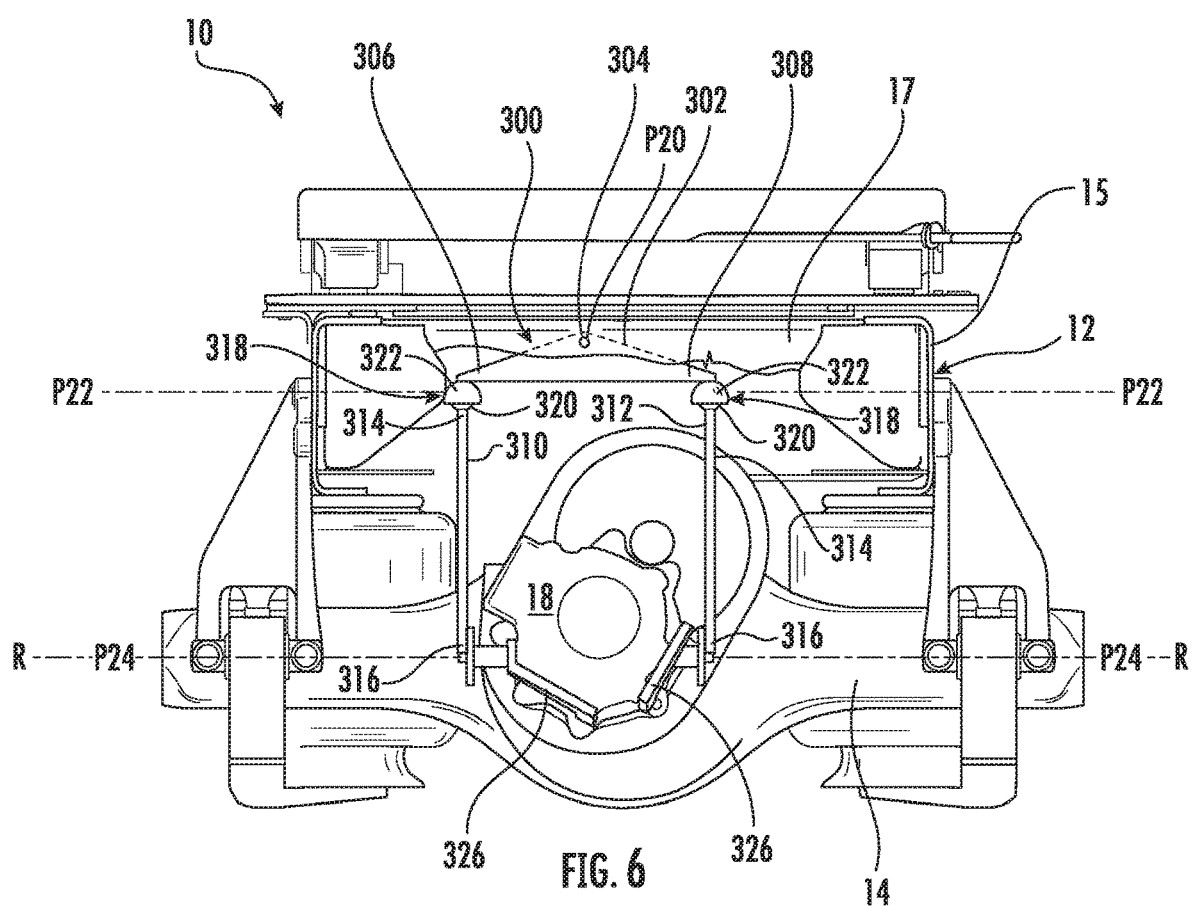
FIG. 6 is an elevational view, taken from a midsection of a vehicle directed rearward therefrom, of a portion of a vehicle including a support apparatus according to yet another embodiment of the presently disclosed subject matter.
Figure 7:
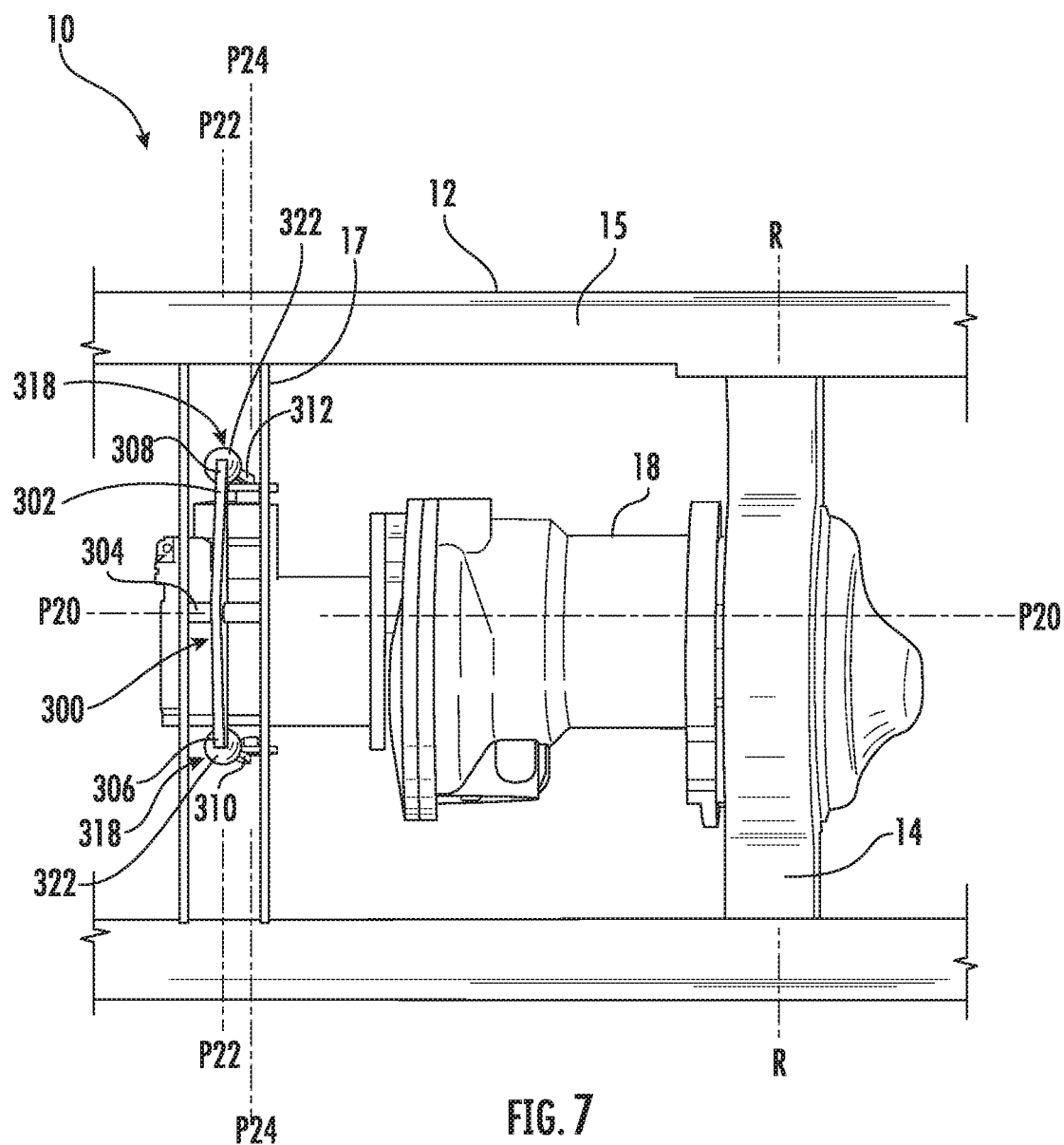
FIG. 7 is a top plan view of the portion of the vehicle including the support apparatus according to the embodiment shown in FIG. 6.

FIGS. 6-7 illustrates the support apparatus 300 according to yet another embodiment. The support apparatus 300 includes a positioning member 302 coupled to the cross-member 17 of the frame 12. It is understood that the positioning member 302 may be any type of positioning device as desired. Various methods of coupling the positioning member 302 to the frame 12 may be employed as desired. In the embodiment shown, the positioning member 302 is coupled to the cross-member 17 by a fastener 304 (e.g. a pin) having opposing ends fixedly coupled to opposing sides of the cross-member 17. A center pivot at which the positioning member 302 is coupled to cross-member 17 defines a first pivot axis P20 of the support apparatus 300. An anti-friction element (not depicted) such as a bushing, for example, may be interposed between the fastener 304 and the positioning member 302 to minimize friction therebetween during a movement of the positioning member 302 about the first pivot axis P20. In certain embodiments, the movement of the support apparatus 300 about the first pivot axis P20 permits the load 18 to translate along an x-axis and a z-axis.

Opposing ends 306, 308 of the positioning member 302 are each pivotally coupled to one of connecting members 310, 312, respectively. Various types of connecting members may be employed for the connecting members 310, 312 including, but not limited to, connecting rods, cables, biasing elements (e.g. springs), shock absorbers, struts, and the like.

In certain embodiments, at least one pivotally coupled joint 318 may be employed to facilitate a coupling of the connecting members 310, 312 to the positioning member 302. The pivotally coupled joint 318 may be any suitable pivotally coupled joint such as a ball joint, a spherical ball joint, a Heim joint, rod end, and the like, for example. In certain embodiments, the pivotally coupled joint 318 may include a ball 320 formed on the ends 314 of the connecting members 310, 312 and a socket 322 formed on the ends 306, 308 of the positioning member 302, wherein the socket 322 is configured to receive at least a portion of the ball 320 therein. It is understood that the ball 320 may be formed on each of the ends 306, 308 of the positioning member 302, and the socket 322 may be formed on each of the ends 314 of the connecting members 310, 312, if desired. It is understood that the pivotally coupled joint 318 may be integrally formed with the ends 314 of the connecting members 310, 312, the positioning member 302, or as a separate and distinct component as desired.

In other embodiments, the ball 320 may be a component formed separately from the members 302, 310, 312 and disposed in the socket 322 coupled to or integrally formed on the ends 314 of the connecting members 310, 312. Both the ball 320 and the socket 322 each include an aperture (not depicted) formed therethrough. The apertures formed in the ball 320 and socket 322 permit an attachment member (not depicted) to be disposed therethrough and extend outwardly therefrom to couple the connecting members 310, 312 to the positioning member 302. It is understood that the socket 322 may be coupled to or integrally formed on the ends 306, 308 of the positioning member 302 and the attachment member may be used to couple the positioning member 302 to the connecting members 310, 312. It is further understood that the pivotally coupled joint 318 may be formed by various other methods if desired.

A pair of end pivots at which the connecting members 310, 312 are coupled to the positioning member 302 defines a second pivot axis P22 of the support apparatus 300. In certain embodiments, the second pivot axis P22 of the support apparatus 300 is horizontally aligned along a y-axis with at least one of the pivot axis PA of the axle 14 and the pivot axis PSS of the suspension system 16. In certain embodiments, a movement of the support apparatus 300 about the second pivot axis P22 permits the load 18 to translate along the y-axis and the z-axis.

Similarly, the ends 316 of the connecting members 310, 312 are each coupled to the load 18. In certain embodiments, each of the ends 316 of the connecting members 310, 312 may be directly coupled to the load 18 by a fastener (not depicted) received in a boss (not depicted) integrally formed in the load 18. In other embodiments, each of the ends 316 of the connecting members 310, 312 may be coupled to the load 18 by support members 326, 328. Various shapes, sizes, and configurations may be employed for the support members 326, 328 depending on a corresponding shape, size, and configuration of the load 18.

In yet other embodiments, at least one pivotally coupled joint (not depicted) may be employed to facilitate a coupling of the connecting members 310, 312 to the load 18. The pivotally coupled joint may be any suitable pivotally coupled joint such as a ball joint, a spherical ball joint, a Heim joint, rod end, and the like, for example. In certain embodiments, the pivotally coupled joint includes a ball (not depicted) formed on the ends 316 of the connecting members 310, 312 and a socket (not depicted) formed on the support members 326, 328 or the load 18, wherein the socket is configured to receive at least a portion of the ball therein. It is understood that the socket may be formed on each of the ends 316 of the connecting members 310, 312, and the ball may be formed on the support members 326, 328 or the load 18, if desired. It is understood that the pivotally coupled joint may be integrally formed with the ends 316 of the connecting members 310, 312, the support members 326, 328, the load 18, or as a separate and distinct component as desired. It is further understood that the pivotally coupled joint may be formed by various other methods if desired.

In other embodiments, the ball may be a component formed separately from the members 302, 310, 312 and disposed in the socket coupled to or integrally formed on the ends 316 of the connecting members 310, 312. Both the ball and the socket each include an aperture (not depicted) formed therethrough. The apertures formed in the ball and socket permit an attachment member (not depicted) to be disposed therein and extend outwardly therefrom to couple the connecting members 310, 312 to the support members 326, 328 or the load 18. It is understood that the socket 322 may be coupled to or integrally formed on the support members 326, 328 or the load 18 and the attachment member may be used to couple the support members 326, 328 or the load 18 to the connecting members 310, 312.

Another pair of end pivots at which the connecting members 310, 312 are coupled to the support members 326, 328, respectively, defines a third pivot axis P24 of the support apparatus 300. In certain embodiments, the third pivot axis P24 of the support apparatus 300 is horizontally aligned along the y-axis with at least one of the pivot axis PA of the axle 14, the pivot axis PSS of the suspension system 16, and the second pivot axis P22 of the support apparatus 300. In certain embodiments, a movement of the support apparatus 300 about the third pivot axis P24 permits the load 18 to further translate along the y-axis and the z-axis.

In operation, the support apparatuses 100, 200, 300 are configured to allow the load 18 coupled to the axle 14 of the vehicle 10 to translate along the x-axis, the y-axis, and the z-axis while providing a support to the load 18. Accordingly, the support apparatuses 100, 200, 300 provide support to the load 18 as the load 18 moves within six degrees of freedom including translating upwards and downwards along the z-axis (heaving), forwards and backwards along the y-axis (surging), left and right along the x-axis (swaying), tilting forward and backwards about the P2, P3, P12, P22 or P24 axes (pitching), pivoting side to side about the P1, P10, P20 axes (rolling) and swiveling left and right about the center pivots and the end pivots thereof as well as through the apertures 118 and the ring-shaped members 120 formed at the ends 114, 116 of the connecting members 110, 112, the apertures and the ring-shaped members 220 formed at the ends 206, 208 of the connecting member 205, and the pivotally coupled joints 318, (and those not depicted), formed at the ends 314, 316 of the connecting members 310, 312 (yawing).

For example, when only one side of the vehicle 10 traverses over an obstacle or through a depression, during an operation thereof, only one side of the axle 14 heaves upwards for the obstacle and downwards for the depression, slightly surges rearward, and slightly sways towards the one side of the axle 14. As such, the support apparatuses 100, 200, 300 pivot and swivel about the respective pivot axes P1, P10, P20, the center pivot, the end pivots, thereof and through the apertures 118 and the ring-shaped members 120 formed at the ends 114, 116 of the connecting members 110, 112, the apertures and the ring-shaped members 220 formed at the ends 206, 208 of the connecting member 205, and the pivotally coupled joints 318, (and those not depicted), formed at the ends 314, 316 of the connecting members 310, 312, thereof to permit the load 18 to translate along the z-axis and x-axis to account for the heaving, swaying, rolling and yawing of the axle 14, and tilt about the respective pivot axes P2, P3, P12, P22, P24 thereof to permit the load 18 to translate along the z-axis and the y-axis to further account for the heaving, surging and pitching of the axle 14, all while providing a support to the load 18.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

The invention claimed is:

1. A vehicle, comprising:
   a frame having at least one elongate member extending longitudinally along a y-axis direction and a cross-member fixedly attached to and extending perpendicular from the at least one elongate member along an x-axis direction; and
   a support apparatus pivotally coupled directly to the cross-member of the frame so as to pivot about a pivot axis parallel to the y-axis direction, wherein the support apparatus extends downward away from the cross-member in a z-axis direction perpendicular to both the x-axis direction and the y-axis direction, and wherein the support apparatus is configured to support a load positioned beneath the cross-member of the frame and permit the load to translate along the x-axis direction and the z-axis direction.

2. The vehicle of claim 1, wherein the support apparatus is configured to permit the load to translate along the x-axis direction, the y-axis direction, and the z-axis direction.

3. The vehicle of claim 1, wherein the support apparatus includes at least two pivot axes.

4. The vehicle of claim 2, wherein the support apparatus includes a positioning member coupled to the cross-member of the frame at a center pivot to permit the load to translate along the x-axis direction and the z-axis direction.

5. The vehicle of claim 2, wherein the support apparatus includes a positioning member coupled to at least one connecting member at an end pivot to permit the load to translate along the y-axis direction and the z-axis direction.

6. The vehicle of claim 2, wherein the support apparatus includes at least one connecting member disposed between a positioning member and the load to permit the load to translate along the y-axis direction and the z-axis direction.

7. The vehicle of claim 2, wherein the support apparatus includes at least one pivotally coupled joint to permit the load to translate along at least one of the x-axis direction, the y-axis direction, and the z-axis direction.

8. A vehicle, comprising:
- a frame having at least one elongate member extending longitudinally along a y-axis direction and a cross-member fixedly attached to and extending perpendicular from the at least one elongate member along an x-axis direction;
- an axle coupled to the frame; and
- a support apparatus pivotally coupled directly to the cross-member of the frame so as to pivot about a cross-member pivot axis parallel to the y-axis direction, wherein the support apparatus extends downward away from the cross-member in a z-axis direction perpendicular to both the x-axis direction and the y-axis direction, and wherein the support apparatus is configured to support a load positioned beneath the cross-member of the frame and coupled to the axle.

9. The vehicle of claim 8, wherein the axle has an axle pivot axis offset from a rotational axis thereof, wherein the axle pivot axis and the rotational axis are parallel to the x-axis direction.

10. The vehicle of claim 9, wherein the load is offset from the rotational axis of the axle.

11. The vehicle of claim 9, wherein the support apparatus has at least one pivot axis in horizontal alignment with the axle pivot axis of the axle.

12. The vehicle of claim 9, wherein the support apparatus has at least one pivot axis in common with at least one of the axle pivot axis and a suspension system pivot axis of a suspension system of the vehicle.

13. The vehicle of claim 9, wherein the axle pivot axis is in common with a suspension system pivot axis of a suspension system of the vehicle.

14. A method for a vehicle, comprising the steps of:
- providing the frame, the axle coupled to the frame, and the support apparatus coupled to the frame according to claim 8; and
- supporting a load coupled to the axle utilizing the support apparatus, wherein the support apparatus permits the load to translate along at least one axis.

15. The method of claim 14, wherein the support apparatus is pivotable about at least one axis.

* * * * *